United States Patent [19]
Vogt et al.

[11] 3,895,005
[45] July 15, 1975

[54] TRIAZOLO[4,3-D][1,4]BENZODIAZEPINE-3,6-DIONES

[75] Inventors: B. Richard Vogt, Yardley, Pa.; Peter C. Wade, Pennington, N.J.

[73] Assignee: E. R. Squibb & Sons, Inc., Princeton, N.J.

[22] Filed: Mar. 4, 1974

[21] Appl. No.: 447,719

[52] U.S. Cl. .......................... 260/239.3 T; 424/269
[51] Int. Cl. .............................. C07d 57/02
[58] Field of Search ............................ 260/239.3 T

[56] References Cited
UNITED STATES PATENTS
3,714,178   1/1973   Hester .............................. 260/308 R
3,717,654   2/1973   Hester .............................. 260/308 R Primary Examiner—Henry R. Jiles
Assistant Examiner—Robert T. Bond
Attorney, Agent, or Firm—Lawrence S. Levinson; Merle J. Smith; Donald J. Barrack

[57] ABSTRACT

Compounds having the structure

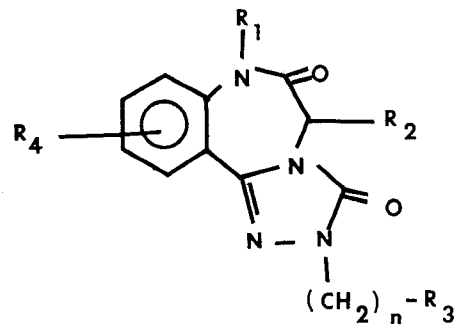

wherein $R_1$ is hydrogen, alkyl, phenyl, or benzyl, $R_2$ is hydrogen or alkyl, $R_3$ is amino, alkylamino, or dialkylamino, $R_4$ is hydrogen, halogen, nitro, cyano, trifluoromethyl, alkyl, alkoxy, or alkylthio, and $n$ is 2, 3, or 4 are useful as anti-inflammatory agents.

12 Claims, No Drawings

TIRAZOLO[3,4-D][1,4]BENZODIAZEPINE-3,6-DIONES

SUMMARY OF THE INVENTION

Compounds having the structure

I

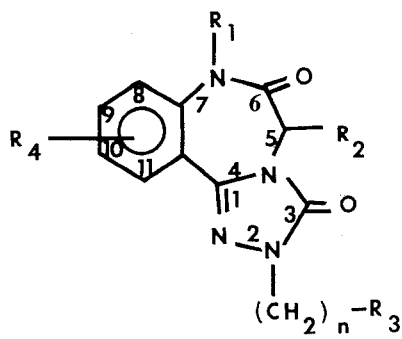

and the pharmaceutically acceptable acid-addition salts thereof, are useful anti-inflammatory agents.

In formula I, and throughout the specification, the symbols are as defined below:

- $R_1$ can be hydrogen, alkyl, phenyl, or benzyl;
- $R_2$ can be hydrogen or alkyl;
- $R_3$ can be amino, alkylamino, or dialkylamino;
- $R_4$ can be hydrogen, halogen (preferably fluorine, chlorine or bromine), nitro, cyano, trifluoromethyl, alkyl, alkoxy, or alkylthio; and
- $n$ is 2, 3, or 4.

The term "alkyl" as used throughout the specification, either by itself or as part of a larger group, refers to both straight and branched chain alkyl groups containing 1, 2, 3, or 4 carbon atoms.

The term "alkoxy," as used throughout the specification, refers to a group of the formula Y—O—, wherein Y is alkyl as defined above.

The term "halogen," as used throughout the specification, refers to fluorine, chlorine, bromine, and iodine.

DETAILED DESCRIPTION OF THE INVENTION

The novel compounds of this invention are produced from compounds having the formula

II

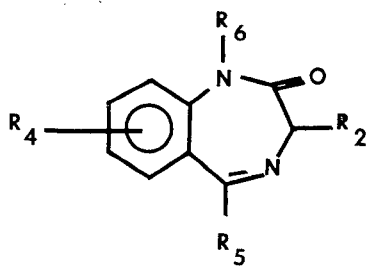

wherein $R_5$ can be halogen (preferably bromine or chlorine), sulfhydryl, alkoxy, alkylthio, or phenylalkylthio and $R_6$ can be alkyl, phenyl, or benzyl. The compounds of formula II are known; see for example U.S. Pat. No. 3,414,563 and Swiss Pat. No. 485,742.

Reaction of a benzodiazepine of formula II with an alkyl carbazate having the formula

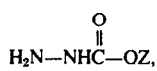

H₂N—NHC—OZ, wherein Z is alkyl, yields a compound having the structure

III

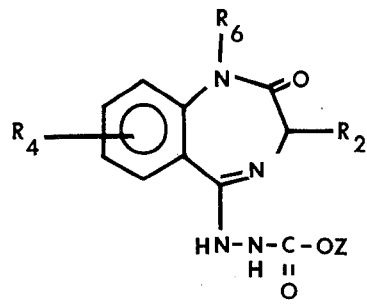

The reaction can be run without a solvent, or in a non-reacting organic solvent, at a temperature of from about 50°C to 250°C for about 5 minutes to 24 hours, preferably from about 80°C to 140°C for about 30 minutes to 6 hours. The benzodiazepine of formula II, and the alkyl carbazate are reacted in approximately a 1:1 molar ratio. Heating a compound of formula III at an elevated temperature, e.g., 80°C to 200°C, preferably 100°C to 180°C, yields a compound having the structure

IV

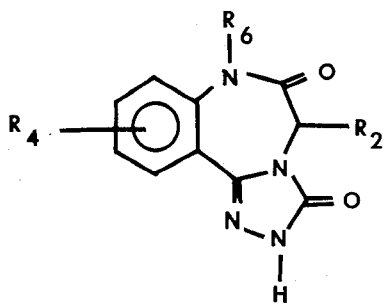

The compounds of formula IV are novel intermediates, and as such, they constitute a part of this invention.

In order to obtain the triazolobenzodiazepines of formula I, a triazolobenzodiazepine of formula IV is reacted with an appropriate base, e.g., thallous ethoxide, to obtain a salt having the structure

V

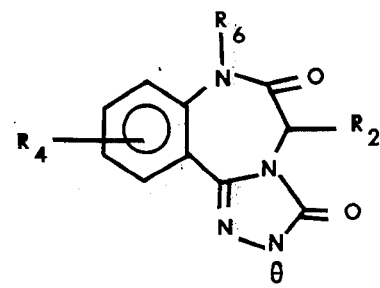

The salt of formula V is subsequently reacted with a compound having the formula $R_3(CH_2)_nX$, wherein X can be chlorine, bromine, iodine, alkylsulfonate (e.g., methanesulfonate) or arylsulfonate (e.g., toluenesulfonate), to obtain a compound having the structure VI 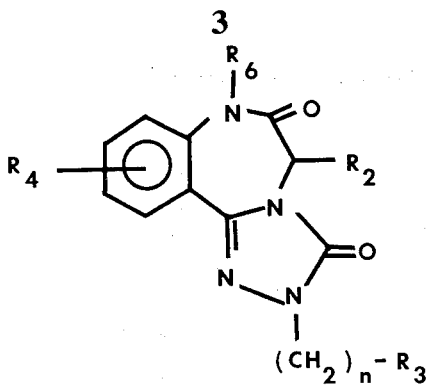

The reaction of a triazolobenzodiazepine of formula IV with thallous ethoxide is run in a non-reactive polar solvent, e.g., dimethylformamide, at a temperature of from about 0°C to 180°C, preferably at room temperature to 80°C, for a period of about 1 minute to 5 hours, preferably for 10 minutes to 1 hour. The reaction of a salt of formula V with a compound of the structure $R_3(CH_2)_nX$ is run at about 50°C to 200°C for a period of about 30 minutes to 72 hours, preferably at 80°C to 140°C for 2 to 24 hours.

Alternatively, the compounds of formula VI can be prepared by first reacting a salt, such as the salt of formula V, with a compound having the formula VII

HO—(CH₂)ₙ—X wherein X and n are as defined previously, to obtain compounds having the structure VIII 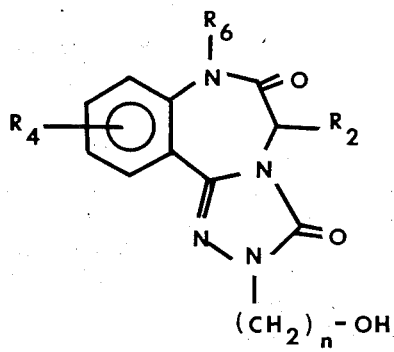

The reaction of a salt of formula V with a compound having the formula HO—(CH₂)ₙ—X is run at about 50°C to 200°C for a period of about 30 minutes to 72 hours, preferably at 80°C to 140 °C for 2 to 24 hours. The compounds of formula VIII are novel intermediates, and as such, they constitute a part of this invention.

The compounds of formula VIII can be converted to the corresponding compounds of formula VI using procedures well known in the art. The proton of the hydroxyl group in the compounds of formula VIII is first converted to a leaving group, e.g., by reacting the compounds with an alkyl (or aryl) sulfonyl halide in the presence of a nonreacting organic base. The resulting intermediate can then be converted to a compound of formula VI by reacting it with ammonia, an alkylamine, or a dialkylamine. This reaction can be carried out in an organic solvent, e.g., toluene, at a temperature of from 25°C to 200°C for 15 minutes to 24 hours, preferably at 80°C to 150°C for 1 hour to 5 hours.

Reduction of triazolobenzodiazepines of formula VI, wherein $R_6$ is benzyl, to yield compounds having the structure IX 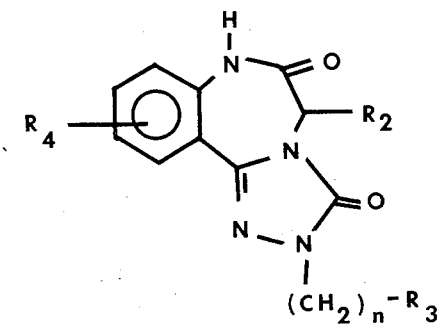

can be accomplished by reacting the compound with hydrogen under pressure in the presence of a catalyst, e.g., palladium or Raney nickel, or by reacting the compound with anhydrous liquid hydrofluoric acid.

Compounds of formula I wherein $R_2$ is hydrogen are preferred.

Compounds of formula I wherein $R_3$ is dialkylamino are preferred.

Compounds of formula I wherein n is 2 or 3 are preferred.

Compounds of formula I wherein $R_4$ is in the 9 or 10-position are preferred, and those wherein $R_4$ is in the 10-position are particularly preferred. Compounds of formula I wherein $R_4$ is halogen or trifluoromethyl are preferred, chlorine being the most preferred halogen.

The triazolobenzodiazepines of formula I form pharmaceutically acceptable acid-addition salts with inorganic and organic acids. These acid-addition salts, in addition to having the useful pharmacological activity of the corresponding free base, frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate acid. Illustratiive are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

The triazolobenzodiazepines of formula I, and the pharmaceutically acceptable acid-addition salts of the compounds, are useful in treating inflammation in mammalian species, e.g., rats, dogs, cats, monkeys, etc. Joint tenderness and stiffness (in condiditions such as rheumatoid arthritis) are relieved by the above described compounds.

The compounds of this invention are formulated for use as anti-inflammatory agents according to accepted pharmaceutical practice in oral dosage forms such as tablets, capsules, elixirs, or powders, or in an injectable form in a sterile aqueous vehicle prepared according to conventional pharmaceutical practice. The compounds of this invention may be administered in amounts of 100 mg/70kg/day to 2 g/70kg/day, preferably 100 mg/70kg/day to 1 g/70/day.

The following examples are specifiic embodiments of this invention.

EXAMPLE 1

10-Chloro-2-[2-(dimethylamino)ethyl]-2,7-dihydro-7-methyl-3H-s-triazolo[4,3-d][1,4]benzodiazepine-3,6(5H)-dione, hydrochloride (1:1)

A.

10-Chloro-2,7-dihydro-7-methyl-3H-s-triazolo[4,3-d]-[1,4]benzodiazepine-3,6(5H)-dione 5,7-Dichloro-1,3-dihydro-1-methyl-2H-1,4-benzodiazepin-2-one (50 g) and ethylcarbazate (43 g) are refluxed in 2,000 ml of toluene for 4 hours. The toluene is decanted from the insoluble mixture and removed under vacuum, producing a white powder which is freed from the accompanying viscous material by stirring with acetonitrile. The white powder is insoluble and is filtered off; the filtrate is saved.

The residue from the original reaction mixture is refluxed for 4 hours in dioxane. The solvent is then removed under vacuum leaving a white powder which is stirred with acetoniitrile to remove viscous impurities. This mixture is filtered, the white powder combined with the powder obtained previously (total 45 g) and recrystallized from 50% methanoldioxane to yield the title compound, melting point 268—269°C.

Both acetonitrile filtrates are combined, stripped and heated at about 100°C for 2 days. This process yields another 5.5 g of product.

Anal. Calc'd for $C_{11}H_9ClN_4O_2$: C, 49.92; H, 3,42; N, 21.17; Cl, 13.40. Found: C, 49,85; H, 3.44; N, 21.20; Cl, 13.32.

10-Chloro-2-[2-(dimethylamino)ethyl]-2,7-dihydro-7-methyl-3H-s-triazolo[4,3-d][1,4]benzodiazepine-3,6(5H)-dione, hydrochloride (1:1)

10-Chloro-2,7-dihydro-7-methyl-3-H-s-triazolo[4,3-d]-[1,4]benzodiazepine-3,6(5H)-dione (7.92 g) is suspended in 120 ml of tetrahydrofuran. Thallous ethoxide (7.5 g) is added dropwise to the suspension while stirring. After the thallous ethoxide is added, stirring is continued for 45 minutes and the mixture is then filtered. The filter cake is washed by stirring as a slurry with ether, aand filtered to yield 13.5 g of the thallium salt.

2-(Dimethylamino)ethyl chloride (1.5 equivalents) is added to a refluxing suspension of the thallium salt in 600 ml of toluene. After 2 hours of reflux, another equal amount of 2-(dimethylamino)ethyl chloride is added and the refluxing is continued for 5 hours.

The reaction mixture is cooled to room temperature and filtered through infusorial earth to remove the thallium salts. The infusorial earth is washed by stirring in benzene and filtered through fresh infusorial earth. The two solutions are combined and passed through a 12 × 4.5 cm column of magnesium silicate. The column is further eluted with about 3 liters of ethyl acetate. After combining the solutions, the solvents are removed under vacuum to yield 7.5 g of product. Recrystallization from ethyl acetate and then from hexane gives a pure product.

A sample (3.5 g) of the product is dissolved in a mixture of methanol and ether (just sufficient methanol to achieve solution), and slightly more than one equivalent of HCl (ethereal) is added. The precipitate is filtered off and further purified by dissolving it in hot methanol, followed by reprecipitation with ether, to give 3.6 g of the title compound, which is dried under vacuum at 140°C overnight. The product has a melting point of 284°–285.5°C. Anal. Calc'd. for $C_{15}H_{19}Cl_2N_5O_2$: C, 48,40; H, 5.15; N, 18.81; Cl, 19.05. Found: C, 48.14; H, 5.42; N, 18.60; Cl, 18.78.

EXAMPLE 2

10-Chloro-2-[3-(dimethylamino)propyl]-2,7-dihydro-7-methyl-3H-s-triazolo[4,3-d][1,4]benzodiazepine-3,6(5H)-dione 10-Chloro-2,7-dihydro-7-methyl-3H-s-triazolo[4,3-d]-[1,4]benzodiazepine-3,6(5H)-dione (2.64 g, prepared as described in Example 1A) is dissolved in 40 ml of dimethylformamide at 70°C. Thallous ethoxide (2.49 g) is added dropwise to the solution while stirring. After the thallous ethoxide is added, stirring is continued for 45 minutes, the mixture is cooled to 25°C, and 200 ml of ether is added. The resulting precipitate is filtered off and dried at 25°C under vacuum for 4 hours to yield 4.5 g of the thallium salt.

3-(Dimethylamino)propyl chloride (1.5 equivalents) is added to a refluxing solution of the thallium salt prepared above in 150 ml of toluene. After 3 hours of reflux, an equal amount of 3-(dimethylamino)propyl chloride is added and the refluxing is continued for 5 hours.

The reaction mixture is cooled to room temperature and filtered through infusorial earth to remove the thallium salts. The infusorial earth is washed by stirring in toluene and filtered through fresh infusorial earth. The two solutions are combined and passed through a 12 × 3 cm column of magnesium silicate. The column is further eluted with about 3 liters of ethyl acetate. After combining the solutions, the solvents are removed under vacuum to yield 2.6 g of product. Recrystallization from ethyl acetate yields the title compound, which is dried for 2 hours at 100°C under vacuum. The title compound has a melting point of 178°–179°C.

Anal. Calc'd. for $C_{16}H_{20}ClN_5O_2$: C, 54.95; H, 5.76; N, 20.02; Cl, 10.14. Found: C, 54,72; H, 6.00; N, 20.02; Cl, 10.06.

EXAMPLE 3 – 13

Following the procedure of Example 1, but substituting the compounds indicated in column I below for 5,7-dichloro-1,3-dihydro-1-methyl-2H-1,4-benzodiazepin-2-one, the compounds indicated in column II are obtained.

| Example | Column I | Column II |
|---|---|---|
| 3 | 1-benzyl-5-chloro-1,3-dihydro-7-(trifluoromethyl)-2H-1,4-benzodiazepin-2-one | 7-benzyl-2-[2-(dimethylamino)ethyl]-2,7-dihydro-10-(trifluoromethyl)-3H-s-triazolo[4,3-d][1,4]benzodiazepine-3,6(5H)-dione, hydrochloride |
| 4 | 5-chloro-1,3-dihydro-1-methyl-7-nitro-2H-1,4-benzodiazepin-2-one | 2-[2-(dimethylamino)ethyl]-2,7-dihydro-7-methyl-10-nitro-3H-s-triazolo[4,3-d][1,4]benzodiazepine-3,6(5H)-dione, hydrochloride |
| 5 | 5-chloro-7-ethylthio-1,3-dihydro-1-methyl-2H-1,4-benzodiazepin-2-one | 2-[2-(dimethylamino)ethyl]-10-ethylthio-2,7-dihydro-7-methyl-3H-s-triazolo[4,3-d][1,4]benzodiazepine-3,6(5H)-dione, hydrochloride |

| Example | Column I | Column II |
|---|---|---|
| 6 | 5-chloro-1,3-dihydro-1,7-dimethyl-2H-1,4-benzodiazepin-2-one | 2-[2-(dimethylamino)ethyl]-2,7-dihydro-7,10-dimethyl-3H-s-triazolo[4,3-d][1,4]-benzodiazepine-3,6(5H)-dione, hydrochloride |
| 7 | 5-chloro-1,3-dimethyl-1,3-dihydro-7-(trifluoromethyl)-2H-1,4-benzodiazepin-2-one | 2-[2-(dimethylamino)ethyl]-2,7-dihydro-5,7-dimethyl-10-(trifluoromethyl)-3H-s-triazolo[4,3-d][1,4]benzodiazepine-3,6-(5H)-dione, hydrochloride |
| 8 | 8-bromo-5-ethoxy-1,3-dihydro-1-phenyl-2H-1,4-benzodiazepin-2-one | 9-bromo-2-[2-(dimethylamino)ethyl]-2,7-dihydro-7-phenyl-3H-s-triazolo[4,3-d][1,4]-benzodiazepine-3,6(5H)-dione, hydrochloride. |
| 9 | 1-benzyl-7-cyano-1,3-dihydro-5-(methylthio)-2H-1,4-benzodiazepin-2-one | 7-benzyl-10-cyano-2-[2-(dimethylamino)ethyl]-2,7-dihydro-3H-s-triazolo[4,3-d]-[1,4]benzodiazepine-3,6(5H)-dione, hydrochloride |
| 10 | 1-benzyl-7-chloro-1,3-dihydro-2H-1,4-benzodiazepin-2-one-5-thione | 7-benzyl-10-chloro-2-[2-(dimethylamino)ethyl]-2,7-dihydro-3H-s-triazolo[4,3-d]-[1,4]benzodiazepine-3,6(5H)-dione, hydrochloride |
| 11 | 5-chloro-7-ethyl-1,3-dihydro-1-phenyl-2H-1,4-benzodiazepin-2-one | 2-[2-(dimethylamino)ethyl]-10-ethyl-2,7-dihydro-7-phenyl-3H-s-triazolo[4,3-d]-[1,4]benzodiazepine-3,6(5H)-dione, hydrochloride |
| 12 | 5-chloro-1-ethyl-1,3-dihydro-2H-1,4-benzodiazepin-2-one | 2-[2-(dimethylamino)ethyl]-7-ethyl-2,7-dihydro-3H-s-triazolo[4,3-d][1,4]benzodiazepine-3,6(5H)-dione, hydrochloride |
| 13 | 5-chloro-1,3-dihydro-7-(methoxy)-1-methyl-2H-1,4-benzodiazepin-2-one | 2-[2-(dimethylamino)ethyl]-2,7-dihydro-10-(methoxy)-7-methyl-3H-s-triazolo[4,3-d][1,4]benzodiazepine-3,6(5H)-dione, hydrochloride |

EXAMPLES 14 – 16

Following the procedure of Example 2, but substituting the compounds indicated in column I below for 3-(dimethylamino)propyl chloride, the compounds indicated in column II are obtained.

| Example | Column I | Column II |
|---|---|---|
| 14 | 3-aminopropyl chloride | 2-[3-(amino)propyl]-10-chloro-2,7-dihydro-7-methyl-3H-s-triazolo[4,3-d][1,4]benzodiazepine-3,6(5H)-dione |
| 15 | 3-(ethylamino)propyl chloride | 10-chloro-2-[3-(ethylamino)propyl]-2,7-dihydro-7-methyl-3H-s-triazolo[4,3-d][1,4]-benzodiazepine-3,6(5H)-dione |
| 16 | 4-(diisopropylamino)butyl chloride | 10-chloro-2-[4-(diisopropylamino)butyl]-2,7-dihydro-7-methyl-3H-s-triazolo[4,3-d][1,4]-benzodiazepine-3,6(5H)-dione |

EXAMPLE 17

10-Chloro-2-[3-(dimethylamino)propyl]-2,7-dihydro-3H-s-triazolo[4,3-d][1,4]benzodiazepine-3,6(5H)-dione

A.

7-Benzyl-10-chloro-2,7-dihydro-3H-s-triazolo[4,3-d]-[1,4]benzodiazepine-3,6(5H)-dione 1-Benzyl-5,7-dichloro-1,3-dihydro-2H-1,4-benzodiazepin-2-one (0.10 mole) and ethyl carbazate (0.11 mole) are mixed together in 400 ml of dimethylformamide for 30 minutes while heating at 130°C to yield 7-benzyl-10-chloro-2,7-dihydro-3-H-s-triazolo[4,3-d][1,4]benzodiazepine-3,6(5H)-dione.

B.

7-Benzyl-10-chloro-2-[3-(dimethylamino)propyl]-2,7-dihydro-3H-s-triazolo[4,3-d][1,4]benzodiazepine-3,6-(5H)-dione 7-Benzyl-10-chloro-2,7-dihydro-3H-s-triazolo[4,3-d]-[1,4]benzodiazepine-3,6(5H)-dione (0.02 mole) is dissolved in 100 ml of dimethylformamide at 70°C. Thallous ethoxide (0.02 mole) is added to the solution and stirred for 1 hour at room temperature. The solution is diluted with 300 ml of ether, and the precipitated salt is filtered off.

3-(Dimethylamino)propyl chloride (1.5 equivalents) is added to a refluxing solution of the thallium salt prepared above in 150 ml of toluene. After 3 hours of reflux, an equal amount of 3-(dimethylamino)propyl chloride is added and the refluxing is continued for 14 hours.

The reaction mixture is cooled to room temperature and filtered through infusorial earth to remove the thallium salts. The infusorial earth is washed by stirring in toluene and filtered through fresh infusorial earth. The two solutions are combined and passed through a 12 × 3 cm column of magnesium silicate. The column is further eluted with about 3 liters of ethyl acetate. After combining the solutions, the solvents are removed under vacuum to yield 7-benzyl-10-chloro-2-[3-(dimethylamino)propyl]-2,7-dihydro-3H-s-triazolo[4,3-d][1,4]benzodiazepine-3,6(5H)-dione.

C.

10-Chloro-2-[3-(dimethylamino)propyl]-2,7-dihydro-3H-s-triazolo[4,3-d][1,4]benzodiazepine-3,6(5H)-dione 7-Benzyl-10-chloro-2-[3-(dimethylamino)propyl]-2,7-dihydro-3H-s-triazolo[4,3-d][1,4]benzodiazepine-3,6(5H)-dione (0.01 mole) is hydrogenated at 60°C in 300 ml of acetic acid contining 0.3 g of pre-reduced Raney nickel. The initial hydrogen pressure is 60 p.s.i. The reduction is stopped after 0.01 mole of hydrogen is absorbed, the catalyst is filtered off, and the solvent is evaporated. The residue is stirred with water and 10-chloro-2-[3-(dimethylamino)-propyl]-2,7-dihydro-3H-s-triazolo[4,3-d][1,4]benzodiazepine-3,6(5H)-dione is filtered off and dried.

EXAMPLES 18 – 20

Following the procedure of Example 17, but substituting the compound indicated in column I below for 1-benzyl-5,7-dichloro-1,3-dihydro-2H-1,4-benzodiazepin-2-one and the compound indicated in column II below for 3-(dimethylamino)propyl chloride, the compound indicated in column III is obtained.

| Example | Column I | Column II | Column III |
| --- | --- | --- | --- |
| 18 | 1-benzyl-5-chloro-1,3-dihydro-7-(methoxy)-2H-1,4-benzodiazepin-2-one | 2-aminoethyl chloride | 2-[2-(amino)ethyl]-2,7-dihydro-10-(methoxy)-3H-s-triazolo[4,3-d] [1,4]benzodiazepine-3,6(5H)-dione |
| 19 | 1-benzyl-5-chloro-1,3-dihydro-3,7-dimethyl-2H-1,4-benzodiazepin-2-one | 3-(methylamino)propyl chloride | 2,7-dihydro-5,10-dimethyl-2-[3-(methylamino)propyl]-3H-s-triazolo[4,3-d] [1,4]-benzodiazepine-3,6(5H)-dione |
| 20 | 1-benzyl-5-chloro-1,3-dihydro-2H-1,4-benzodiazepin-2-one | 2-(isobutylamino)ethyl chloride | 2,7-dihydro-2-[2-(isobutylamino)ethyl]-3H-s-triazolo-[4,3-d] [1,4]benzodiazepine-3,6(5H)-dione |

EXAMPLE 21

10-Chloro-2,7-dihydro-2-[3-(isopropylamino)propyl]-7-methyl-3H-s-triazolo[4,3-d][1,4]benzodiazepine-3,6(5H)-dione A.
10-Chloro-2,7-dihydro-2-(3-hydroxypropyl)-7-methyl-3H-s-triazolo[4,3-d][1,4]benzodiazepine-3,6(5H)-dione 10-Chloro-2,7-dihydro-7-methyl-3H-s-triazolo[4,3-d]-[1,4]benzodiazepine-3,6(5H)-dione (7.92 g, prepared as described in Example 1A) is suspended in 120 ml of tetrahydrofuran. Thallous ethoxide (7.5 g) is added dropwise to the suspension while stirring. After the thallous ethoxide is added, stirring is continued for 45 minutes and the mixture is then filtered to yield 13.5 g of the thallium salt.

To a stirring, refluxing suspension of 3 g of the thallium salt in toluene is added 3 ml of 1-chloro-3-hydroxypropane. After refluxing for 72 hours, another 3 ml of the chloro alcohol is added and heating is continued for another 24 hours. The solution is cooled to room temperature and filtered through infusorial earth to remove the thallium salts. The infusorial earth is washed by stirring in toluene and then filtered through fresh infusorial earth. The two solutions are combined and passed through a 12 × 3 cm column of magnesium silicate. The column is further eluted with about 3 liters of ethyl acetate. After combining the solutions, the solvents are removed under vacuum to yield 1.3 g of a product. Recrystallization from ethyl acetate, and drying under vacuum for 2 hours at 100°C, gives the title compound, melting point 171°–172°C.

Anal. Calc'd. for $C_{14}H_{15}ClN_4O_3$: C, 52.10; H, 4.68; N, 17.36; Cl, 10.99. Found: C, 51.88; H, 4.75; N, 17.38; Cl, 11.10.

B.
10-Chloro-2,7-dihydro-7-methyl-2-[3-(p-toluenesulfonyloxy)propyl]-3H-s-triazolo[4,3-d][1,4]-benzodiazepine-3,6(5H)-dione 10-Chloro-2,7-dihydro-2-(3-hydroxypropyl)-7-methyl-3H-s-triazolo[4,3-d][1,4]benzodiazepine-3,6(5H)-dione (1.0 mole) and p-toluenesulfonyl chloride (0.20 mole) are added to 150 ml of pyridine. The reaction mixture is stirred at 5°C for 24 hours. The reaction is poured into 700 ml of water and the resulting precipitate is filtered off. The filter cake is washed with fresh water, filtered off and dried at 25°C under vacuum for 24 hours to yield the title compound.

C.
10-Chloro-2,7-dihydro-2-[3-(isopropylamino)propyl]-7-methyl-3H-s-triazolo[4,3-d][1,4]benzodiazepine-3,6-(5H)-dione 10-Chloro-2,7-dihydro-7-methyl-2-[3-(p-toluenesulfonyloxy)propyl]-3H-s-triazolo[4,3-d][1,4]benzodiazepine-3,6(5H)-dione (0.05 mole) and isopropylamine (0.1 mole) are refluxed in 600 ml of toluene for 3 hours. The reaction mixture is cooled to 25°C and the resulting precipitate is filtered off. The product is extracted from the toluene filtrate into 10% hydrochloric acid. The acid solution is made basic with 10% sodium bicarbonate and the product is extracted into chloroform. The solvent is removed under vacuum, and the residue is recrystallized from ethanol and dried under vacuum at 40°C for 3 hours to give the title compound.

What is claimed is:
1. A compound having the formula

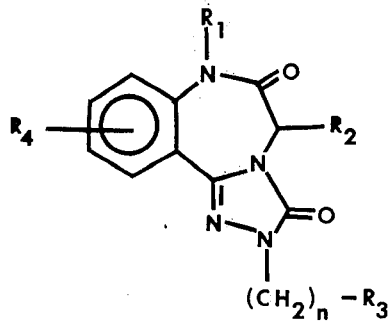

or a pharmaceutically acceptable acid-addition salt thereof, wherein $R_1$ is hydrogen, alkyl, phenyl or benzyl; $R_2$ is hydrogen or alkyl; $R_3$ is amino, alkylamino or dialkylamino; $R_4$ is hydrogen, halogen, nitro, cyano, trifluoromethyl, alkyl, alkoxy or alkylthio; and $n$ is 2, 3 or 4; wherein alkyl is alkyl of 1 to 4 carbon atoms and alkoxy is alkoxy of 1 to 4 carbon atoms.

2. A compound in accordance with claim 1 wherein $R_3$ is amino.

3. A compound in accordance with claim 1 wherein $R_3$ is alkylamino.

4. A compound in accordance with claim 1 wherein $R_3$ is dialkylamino.

5. A compound in accordance with claim 1 wherein $R_1$ is alkyl, phenyl or benzyl.

6. A compound in accordance with claim 1 wherein $R_1$ is hydrogen.

7. A compound in accordance with claim 1 wherein $R_2$ is hydrogen.

8. The compound in accordance with claim 1 having the name 10-chloro-2-[2-(dimethylamino)ethyl]-2,7-dihydro-7-methyl-3H-s-triazolo[4,3-d][1,4]benzodiazepine-3,6-(5H)-dione, hydrochloride.

9. The compound in accordance with claim 1 having the name 10-chloro-2-[3-(dimethylamino)propyl]-2,7-dihydro-7-methyl-3H-s-triazolo[4,3-d][1,4]benzodiazepine-3,6(5H)-dione.

10. A compound having the formula

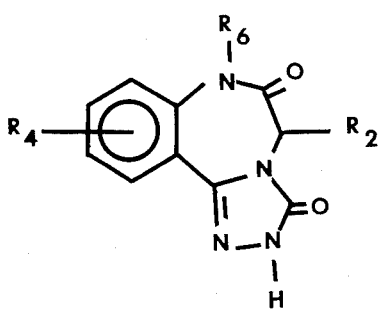

wherein $R_2$ is hydrogen or alkyl; $R_4$ is hydrogen, halogen, nitro, cyano, trifluoromethyl, alkyl, alkoxy or alkylthio; and $R_6$ is alkyl, phenyl or benzyl; and wherein alkyl is alkyl of 1 to 4 carbon atoms and alkoxy is alkoxy of 1 to 4 carbon atoms.

11. A compound having the formula

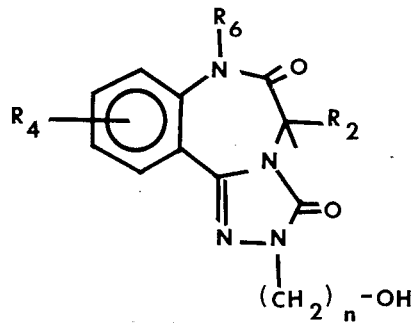

wherein $R_2$ is hydrogen or alkyl; $R_4$ is hydrogen, halogen, nitro, cyano, trifluoromethyl, alkyl, alkoxy or alkylthio; $R_6$ is alkyl, phenyl or benzyl; and n is 2, 3 or 4; and wherein alkyl is alkyl of 1 to 4 carbon atoms and alkoxy is alkoxy of 1 to 4 carbon atoms.

12. The compound in accordance with claim 11 having the name 10-chloro-2,7-dihydro-2-(3-hydroxypropyl)-7-methyl-3H-s-triazolo[4,3-d][1,4]benzodiazepine-3,6(5H)-dione.

* * * * *